(12) United States Patent
Lu et al.

(10) Patent No.: US 7,948,460 B2
(45) Date of Patent: May 24, 2011

(54) LIQUID CRYSTAL DISPLAY APPARATUS

(75) Inventors: Xin Lu, Shenzhen (CN); Yu-Cui Zhou, Shenzhen (CN); Shih-Fang Wong, Taipei Hsien (TW)

(73) Assignees: Hong Fu Jin Precision Industry (ShenZhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 809 days.

(21) Appl. No.: 11/861,307

(22) Filed: Sep. 26, 2007

(65) Prior Publication Data

US 2008/0186424 A1    Aug. 7, 2008

(30) Foreign Application Priority Data

Feb. 7, 2007    (CN) .......................... 2007 1 0200168

(51) Int. Cl.
*G09G 3/36*    (2006.01)

(52) U.S. Cl. ............................................. 345/87; 349/58

(58) Field of Classification Search .................... 345/31, 345/51–52, 82–83, 87–90, 95, 98, 104, 108–111, 345/214, 697–699; 361/800–801; 349/58
See application file for complete search history.

(56) References Cited

U.S. PATENT DOCUMENTS

| | | | |
|---|---|---|---|
| 6,057,902 A | 5/2000 | Angelopoulos et al. | |
| 6,236,384 B1 | 5/2001 | Didier et al. | |
| 6,628,255 B1 | 9/2003 | Ferrel et al. | |
| 7,609,833 B2 * | 10/2009 | Chu et al. | 379/433.13 |
| 2004/0145822 A1 | 7/2004 | Pan et al. | |
| 2005/0041147 A1 * | 2/2005 | Kim et al. | 348/511 |
| 2005/0122279 A1 * | 6/2005 | Tseng et al. | 345/10 |

FOREIGN PATENT DOCUMENTS

| | | |
|---|---|---|
| CN | 1839334 A | 9/2006 |
| JP | 07-261144 A | 10/1995 |

* cited by examiner

*Primary Examiner* — Quan-Zhen Wang
*Assistant Examiner* — Mansour M Said
(74) *Attorney, Agent, or Firm* — Frank R. Niranjan

(57) ABSTRACT

A liquid crystal display apparatus includes a display unit, a drive rod, and an adjusting module. The display unit is for displaying information. The drive rod is connected to the display unit for moving along with the display unit. The adjusting module is connected to the drive rod, for rotating the drive rod.

11 Claims, 4 Drawing Sheets

LIQUID CRYSTAL DISPLAY APPARATUS

BACKGROUND OF THE INVENTION

1. Field of the Invention

The present invention generally relates to a liquid crystal display apparatus, and particularly to a liquid crystal display apparatus having an adjustable viewing angle.

2. Description of Related Art

A typical LCD apparatus includes a display module and a drive module. The drive module is used for processing data, and the display module is used for displaying images according to the data. A performance of the LCD apparatus depends on characteristics of the display module.

Referring to FIG. 3, a liquid crystal display apparatus includes a conventional display module 999. The display module 999 includes a backlight source 100 and an LCD panel 200. The backlight source 100 is used for emitting light. The LCD panel 200 is used for selectively transmitting the light to display images. The LCD panel 200 has various types, and one typical type is TFT (Thin Film Transistor) LCD panel. As a TFT LCD panel, the LCD panel 200 includes an array of display units 210.

Referring to FIG. 4, the display unit 210 includes a first polarizing plate 211, a second polarizing plate 212, a liquid crystal layer 213, and a color filter 214. The first polarizing plate 211 is used for converting the light to linearly polarized light. The liquid crystal layer 213 is used for transmitting the linearly polarized light. When a voltage is applied across the liquid crystal layer 213, the linearly polarized light passes through liquid crystal layer 213 normally. When no voltage is applied across the liquid crystal layer 213, a polarization of the linearly polarized light is rotated at 90 degrees. The second polarizing plate 212 is used for absorbing the linearly polarized light when no voltage is applied across the liquid crystal layer 213. The second polarizing plate 212 is also used for transmitting the linearly polarized light when the voltage is applied across the liquid crystal layer 213. The color filter 214 is used for modulating the linearly polarized light to make the displayed images more colorful.

The liquid crystal layer 213 accommodates liquid crystal molecules 217. The liquid crystal layer 213 includes a first transparent electrode 215, a second transparent electrode 216, a first alignment film 218, and a second alignment film 219. The first transparent electrode 215 and the second transparent electrode 216 are set on two sides of the liquid crystal layer 213 to generate an electric field therebetween. The first alignment film 218 is formed on an inner surface of the first transparent electrode 215 along a first direction, and the second alignment film 219 is formed on an inner surface of the second transparent electrode 216 along a second direction. The first direction is perpendicular to the second direction.

When no voltage is applied across the liquid crystal layer 213, the liquid crystal molecules 217 are forced into a 90-degree twisted structural arrangement between the first alignment film 218 and the second alignment film 219. According to characteristic of the liquid crystal molecules 217, a polarization of the linearly polarized light is rotated 90 degrees as the linearly polarized light passes through the liquid crystal layer 213. When the voltage is applied across the liquid crystal layer 213, the liquid crystal molecules 217 are aligned parallel to the electric field and the linearly polarized light passes through the liquid crystal layer 213 normally.

When the LCD apparatus is used, it is often needed to rotate the LCD apparatus to slant to users. However, when the LCD apparatus is placed in a corner of a room, the space of the corner restricts rotation of the LCD apparatus. That is, it is convenient to directly rotate the LCD apparatus in the corner and a large space is needed.

Therefore, an LCD apparatus is needed in the industry to address the aforementioned deficiencies and inadequacies.

SUMMARY OF THE INVENTION

A liquid crystal display apparatus includes a display unit, a drive rod, and an adjusting module. The display unit is for displaying information. The drive rod is connected to the display unit for moving along with the display unit. The adjusting module is connected to the drive rod, for rotating the drive rod.

Other systems, methods, features, and advantages of the present liquid crystal display apparatus will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present liquid crystal display apparatus can be better understood with reference to following drawings. Components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe a preferred embodiment of the present LCD apparatus.

Figure 1:
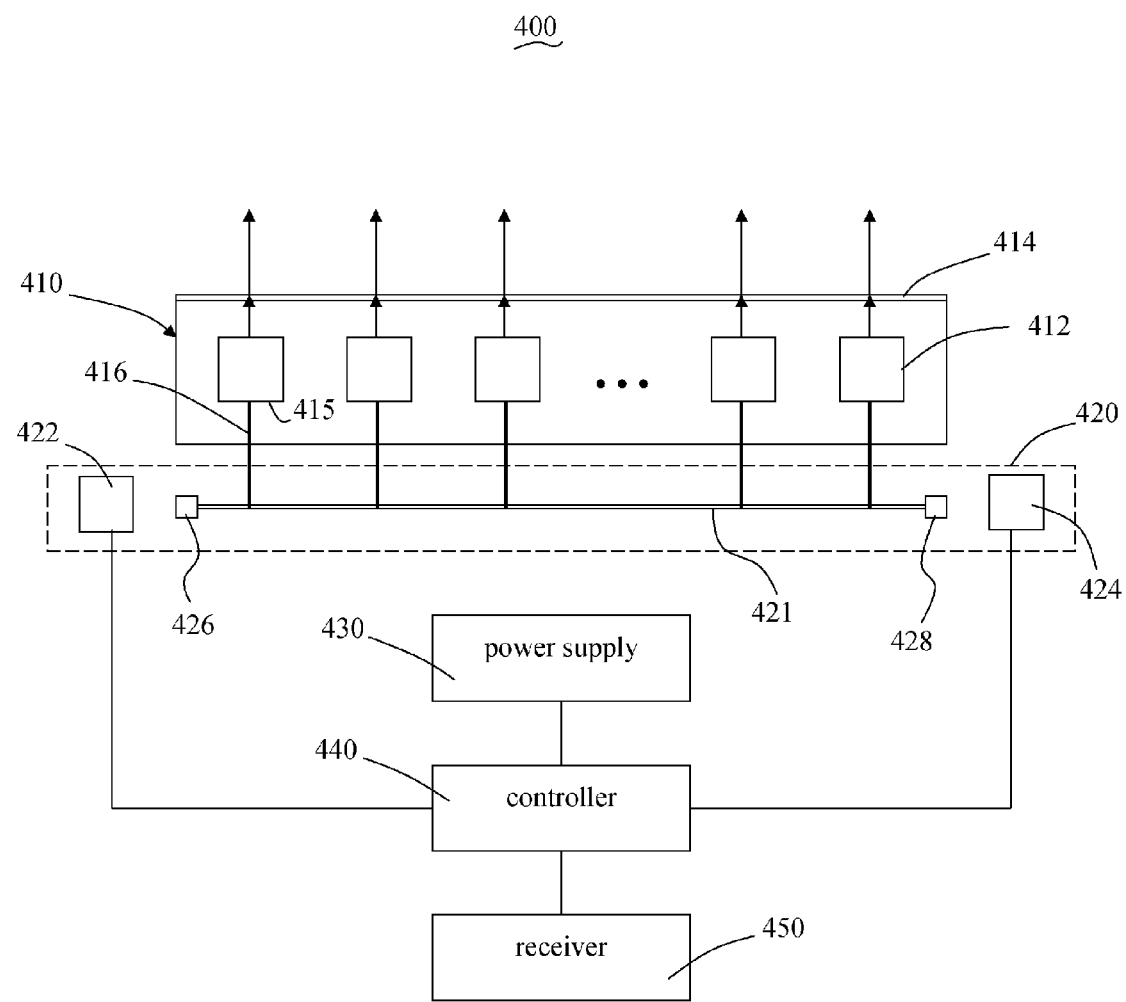
FIG. 1 is a schematic diagram showing a liquid crystal display apparatus in accordance with an exemplary embodiment.

Referring to FIG. 1, an LCD apparatus 400 in accordance with a preferred exemplary embodiment includes a liquid crystal module 410, an adjusting module 420, a power supply 430, a controller 440, and a receiver 450. The liquid crystal module 410 is for displaying images. The adjusting module 420 is for adjusting a viewing angle of the liquid crystal module 410. The power supply 430 is for supplying voltage to the adjusting module 420. The controller is for modulating the voltage based on a signal that instructs the liquid crystal display apparatus to project information to a predetermined side. The receiver 450 is for receiving the signal. The receiver 450 can be a wireless receiver and the signal is carried on an electromagnetic wave, or the receiver 450 is a mechanism that is adjusted manually.

The liquid crystal module 410 includes a plurality of display units 412, a transparent layer 414, and a plurality of drive rods 416. Each display unit 412 is used for emitting backlight and displaying information of a pixel using the backlight. Each display unit 412 can be rotated around a pivot point (not shown) in a center of the display unit 412. The transparent layer 414 is near a display surface of the display unit 412.

Each display unit 412 corresponds to a drive rod 416, and an emitting surface 415 of the display unit 412 is integrally formed with a corresponding drive rod 416. Each drive rod 416 can also be rotated around a pivot point of a corresponding display unit 412. When the drive rods 416 rotate, the display units 412 also rotate. That is, the display units 412 rotate along with the drive rods 416.

The adjusting module 420 is connected to the drive rods 416 to rotate the drive rods 416. The adjusting module 420 includes a sheet 421, a first electromagnet 422, a second electromagnet 424, a first ferromagnet 426, and a second ferromagnet 428. The sheet 421 is connected to the first ferromagnet 426, the second ferromagnet 428, and the drive rods 416. A first end of each drive rod 416 is connected to the sheet 421, and a second end of the drive rod 416 is integrally formed with a corresponding display unit 412. The first ferromagnet 426 is connected to the left end of the sheet 421, and the second ferromagnet 426 is connected to the right end of the sheet 421. The first electromagnet 422 is disposed near the first ferromagnet 426, and the second electromagnet 424 is disposed near the second ferromagnet 428.

The first electromagnet 422 and the second electromagnet 424 are electrically connected to the controller 440 to receive the modulated voltage correspondingly. When the first electromagnet 422 receives the modulated voltage, the first electromagnet 422 generates a first magnetic field to attract the first ferromagnet 426. Similarly, when the second electromagnet 424 receives the modulated voltage, the second electromagnet 424 generates a second magnetic field to attract the second ferromagnet 428.

Figure 2:
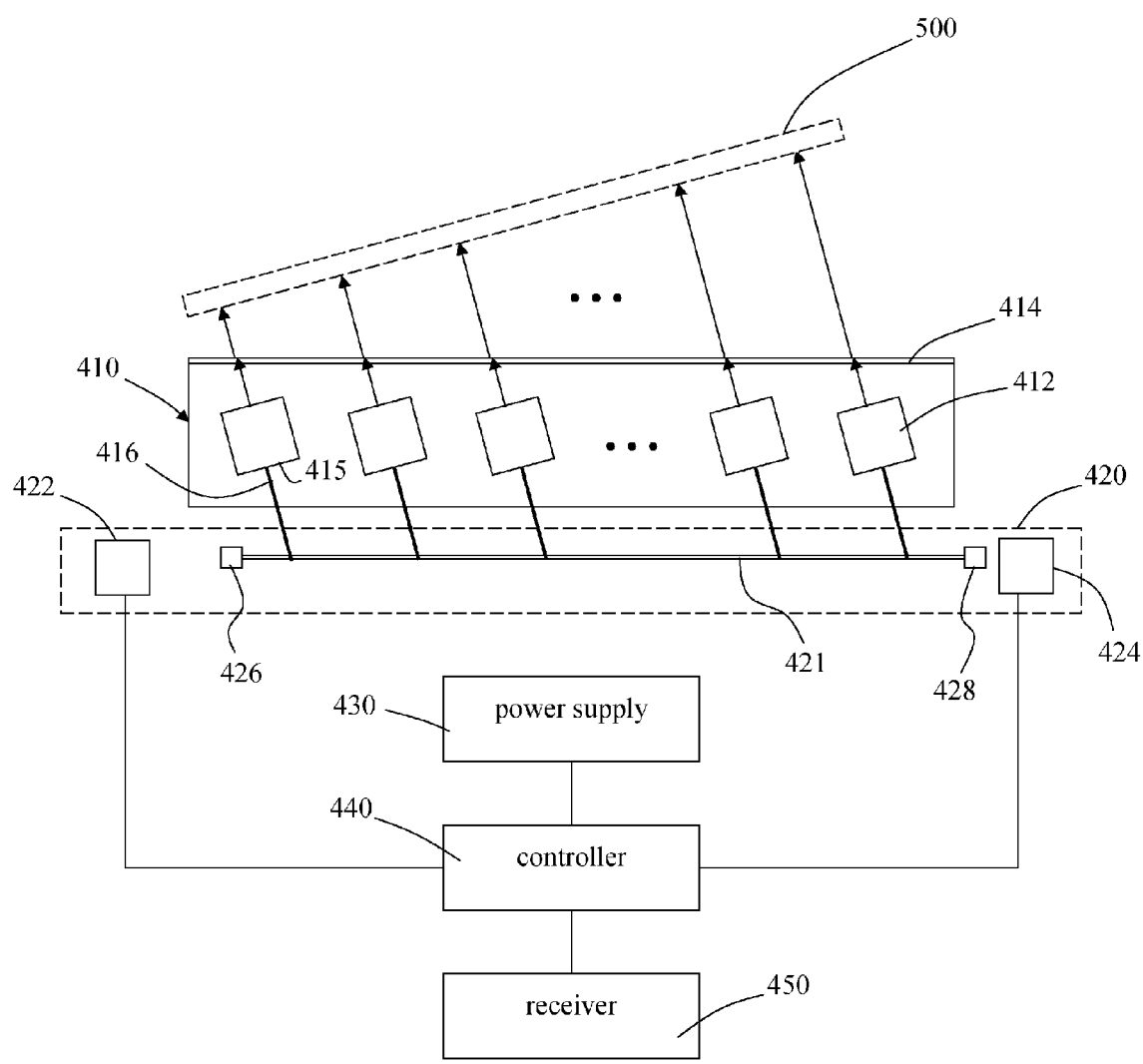
FIG. 2 is a schematic diagram showing the liquid crystal display apparatus displaying images to a left side of FIG. 1.
Figure 3:
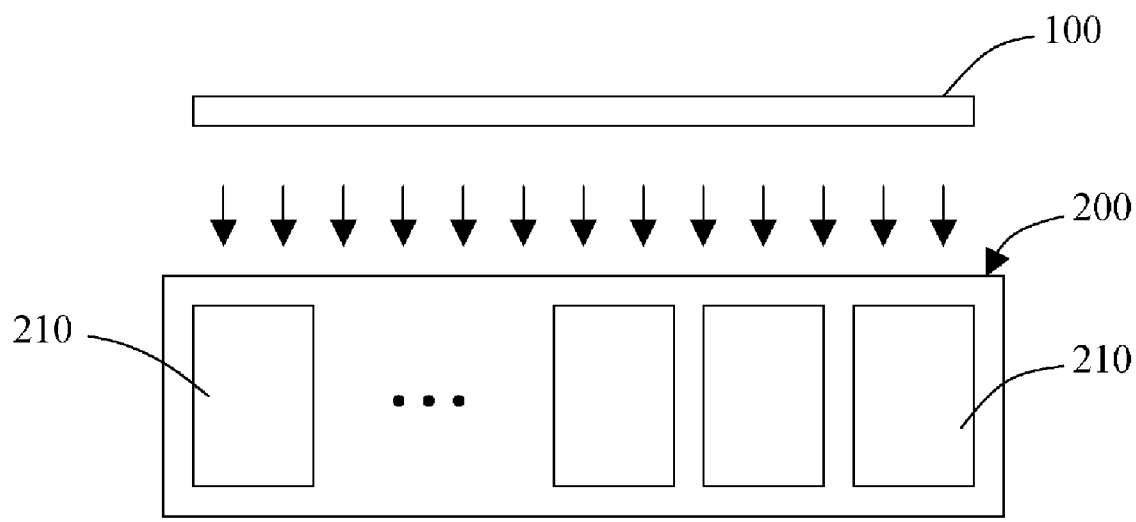
FIG. 3 is a schematic diagram showing a conventional liquid crystal display apparatus including a display unit.
Figure 4:
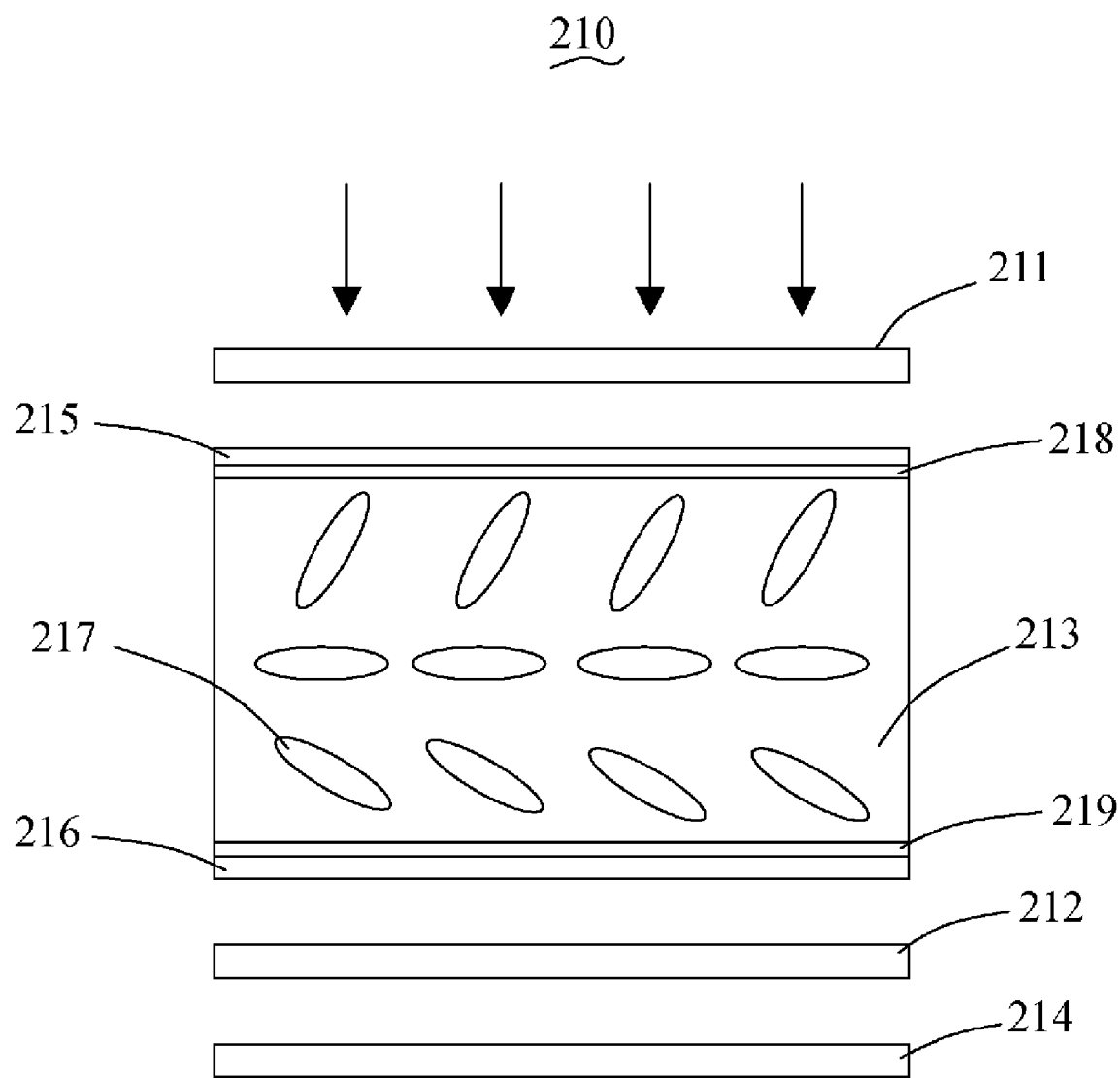
FIG. 4 is a schematic diagram showing the display unit of FIG. 3.

Referring to FIG. 2, the LCD apparatus 400 projects images to a left side. In operation, the receiver 450 receives a signal that instructs the LCD apparatus 400 to project the images towards the left side, and send the signal to the controller 440. The power supply 430 supplies a voltage to the controller 440. The controller 440 modulates the voltage, and generates a first voltage and a second voltage that is larger than the first voltage. The first voltage is sent to the first electromagnet 422, and the second voltage is sent to the second electromagnet 424. A magnetism of the first magnetic field is smaller than a magnetism of the second magnetic field. Therefore, the sheet 421 moves towards the second electromagnet 424. An end of each drive rod 416 connected to the sheet 421 also moves towards the second electromagnet 424. The display surface of each display unit 412 slants towards the left side. The display units 412 emit light. The light is perpendicular to the display surface of each display unit 412, and is projected on an inside surface of the transparent layer 414. The light is transmitted out from the outside surface of the transparent layer 414, and forms a virtual display screen 500 in the left side.

Similarly, when projecting images towards the right side, the controller 440 changes the first voltage to be larger than the second voltage. The magnetism of the first magnetic field is larger than the magnetism of the second magnetic field. Therefore, the sheet 421 moves towards the first electromagnet 424. An end of each drive rod 416 connected to the sheet 421 also moves towards the first electromagnet 424. The display surface of each display unit 412 slants towards the right side. The display units 412 emit light. The light is transmitted out from the outside surface of the transparent layer 414, and forms a virtual display screen in the right side.

As mentioned above, the LCD apparatus 400 uses an adjusting module 420 to rotate the display units 412. Therefore, a direction of an emitted light from the display units 412 can be adjusted, and images from the display units 412 can project towards the left/right side.

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. A liquid crystal display apparatus comprising:
a display unit for and displaying information;
a drive rod connected to the display unit for moving along with the display unit; and
an adjusting module connected to the drive rod, for rotating the display unit by the drive rod to adjust a viewing angle of the liquid crystal display apparatus;
wherein the adjusting module comprises a sheet connected to the drive rod, a first ferromagnet connected to a left end of the sheet, a second ferromagnet connected to a right end of the sheet, a first electromagnet disposed near the first ferromagnet, and a second electromagnet disposed near the second ferromagnet; the first electromagnet is used for receiving the voltages to generate a first magnetic field to attract the first ferromagnet, and the second electromagnet is used for receiving the voltages to generate a second magnetic field to attract the second ferromagnet.

2. The liquid crystal display apparatus according to claim 1, further comprising a power supply for supplying the voltages.

3. The liquid crystal display apparatus according to claim 2, further comprising a receiver for receiving a signal instructing the liquid crystal display apparatus to display information.

4. The liquid crystal display apparatus according to claim 1, further comprising a controller for modulating the voltages based on the signal.

5. The liquid crystal display apparatus according to claim 1, further comprising a transparent layer near a display surface of the display unit.

6. A liquid crystal display apparatus comprising:
a receiver for receiving a signal instructing the liquid crystal display apparatus to display information;
a display unit for displaying information;
a drive rod connected to the display unit for moving along with the display unit; and an adjusting module connected to the drive rod, for rotating the display unit by the drive rod to adjust a viewing angle of the liquid crystal display apparatus;
an adjusting module for rotating the display unit based on the signal, the adjusting module comprising:
a sheet connected to the display unit; and
at least one ferromagnet and at least one electromagnet for cooperatively driving the sheet to move;
wherein the sheet is used for rotating the display unit when driven by the at least one ferromagnet and the at least one electromagnet.

7. The liquid crystal display apparatus according to claim 6, wherein the at least one ferromagnet comprises a first ferromagnet and a second ferromagnet connected to two ends of the sheet respectively.

8. The liquid crystal display apparatus according to claim 7, wherein the at least one electromagnet comprises a first electromagnet disposed near the first ferromagnet and a second electromagnet disposed near the second ferromagnet.

9. The liquid crystal display apparatus according to claim 7, further comprising a controller connected to the first electromagnet and the second electromagnet, and the controller is for sending a first voltage to the first electromagnet and for sending a second voltage to the second electromagnet.

10. The liquid crystal display apparatus according to claim 9, further comprising a power supply connected to the controller for sending a voltage to the controller.

11. The liquid crystal display apparatus according to claim 6, further comprising a drive rod connected to the display unit and the sheet.

* * * * *